May 17, 1927. 1,629,044
H. B. MORTER
PRAIRIE FIRE-FIGHTER
Filed July 23 1926
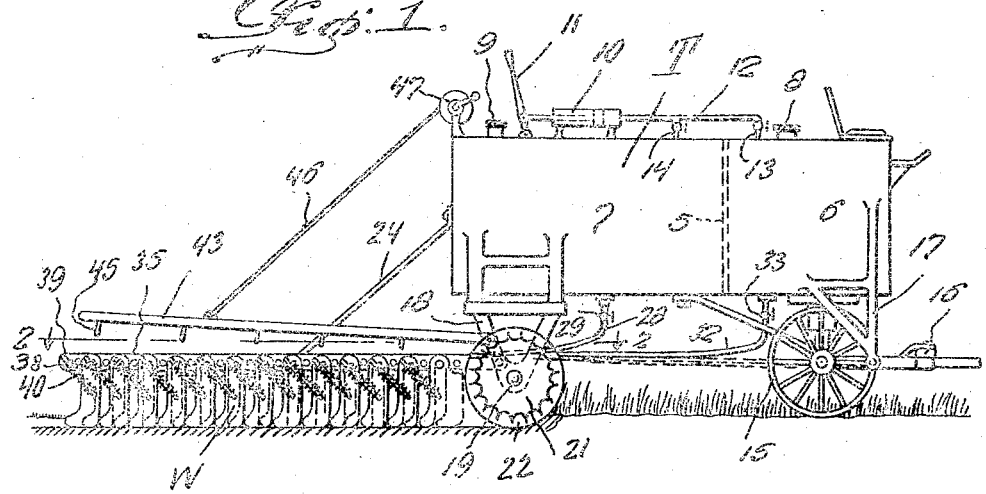
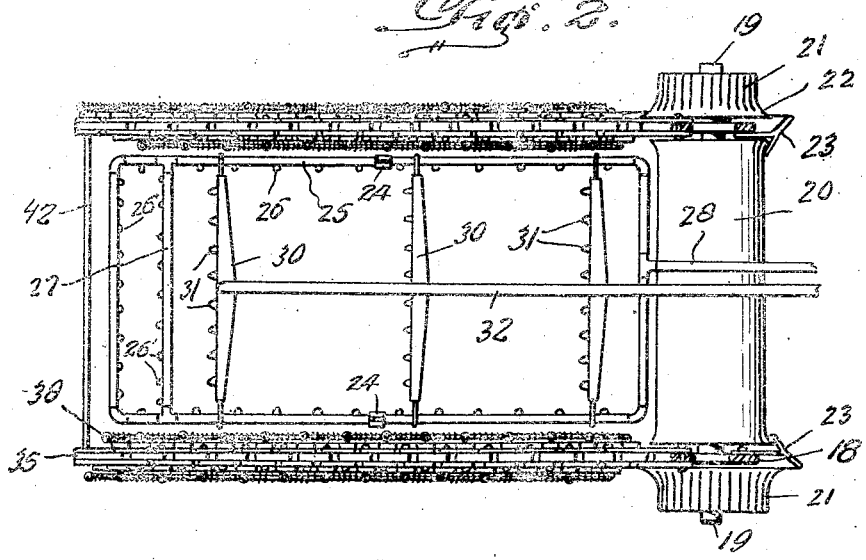
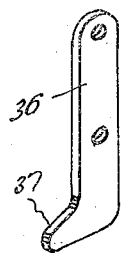
Inventor
H. B. Morter,
By Clarence A. O'Brien
Attorney Patented May 17, 1927.

1,629,044

UNITED STATES PATENT OFFICE.

HARVEY B. MORTER, OF AINSWORTH, NEBRASKA.

PRAIRIE-FIRE FIGHTER.

Application filed July 23, 1926. Serial No. 124,426.

The present invention relates to a contrivance for fighting prairie fires and aims to provide a device which is capable of burning a strip of prairie land, so as to form a barrier against the further progress of the fire.

Another very important object of this invention resides in the provision of a device of this nature with means for sprinkling fire extingushing fluid on the burnt ground so as to prevent the apparatus from causing a fire.

Another very important object of the invention is to provide a contrivance of this nature with a flexible confining apparatus so that the strip of ground to be burnt thereby will be confined within predetermined limits.

A still further very important object of the invention lies in the provision of a device of this nature with an exceedingly simple construction, one which is thoroughly efficient and reliable in operation, inexpensive to operate and manufacture, strong and durable, easy to manipulate, not likely to readily get out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the apparatus embodying the features of my invention, Fig. 2 is a horizontal section taken substantially on the line 2—2 of Fig. 1, looking downwardly, and Fig. 3 is a detail perspective of one of the wall forming sections.

Referring to the drawing in detail, it will be seen that the letter T denotes a tank divided by partition 5 into compartments 6 and 7. The forward compartment 6 is adapted to hold liquid fuel, such as kerosene, gasoline, or the like, while the rear compartment 7 is adapted to hold some cheap and efficient fire extinguishing fluid. These compartments 6 and 7 may be filled by removal of the respective caps 8 and 9, on inlets at the top thereof. An air pump 10 of suitable construction is mounted on top of the tank T, is operable by a lever 11, and has a pipe 12 leading therefrom with valve controlled branches 13 and 4 leading respectively to compartments 6 and 7.

The forward end of the tank is mounted in any suitable manner on a wheeled truck 15 having suitable draft means 16 attached thereto. Brackets 17 are provided on the forward sides of the tank so that additional draft means may be attached thereto. Suitable uprights 18 are fixed to the rear of the tank T, and depend down below the same and have journaled in their lower extremities an axle 19 on which is disposed a roller or drum 20 between the uprights 18 and corrugated wheels 21 to the outside of said brackets.

The wheels 21 are provided with sharpened flanges 22 at their inner edges for forming furrows. Guide shields 23 are fixed to the uprights between the ends of the roller 20 and the wheels 22, for guiding the grass toward the roller 20 so that as the contrivance moves along, said grass will be pulled down. A pair of brackets 24 extend rearwardly and downwardly from the rear end of the tank T for supporting a rectangular pipe frame 25 having a plurality of jets 26 in the sides and rear end thereof. A cross pipe 27 is provided in the pipe frame 25 adjacent the rear end and is also provided with a plurality of jets 26'.

A pipe 28 is coupled to the forward end of the pipe frame 25 and is connected with the compartment 7 and has a valve 29 therein so that the fire extinguishing fluid from the compartment 7 may be controlled. A plurality of transversely disposed burners 30 have their ends engaged on the sides of the pipe frame 25, so as to be disposed in parallel spaced relation. These burners are provided with jets 31 and are connected to a pipe 32 leading from the compartment 6 and having a valve 33 therein.

It will thus be seen that when the valves 29 and 33 are open, the pressure created by the pump 10 will force the respective fluids through the pipes 32 and 28 and when the burners are lighted, the grass within the area confined by the pipe frame 25 will be thoroughly burned and the fire will be confined by the fire extinguishing liquid forced out of the jets 26.

As a further precaution in confining the fire, I provide a pair of flexible walls indicated generally by the letter W. Each wall W includes a chain 35, the forward link of which is pivoted to one upright 18 so as to extend rearwardly therefrom. A plurality of wall sections 36 have their upper ends pivotally engaged on the pivot pins of the chain and there is a series of these sections 36 on each side of the chain, a section on one side being disposed between the sections on the other side, as will be apparent from an inspection of Figs. 1 and 2. Each section 36 is provided at its bottom with a rearwardly disposed shoe 37 for engaging in the furrow made by one of the flanges 22. Most of the pivot pins of the chain 35 terminate in eyes 38, through which are slidable rods 39, the lower ends of which are pivoted to intermediate portions of the sections immediately forward thereof, and springs 40 are disposed on the shanks impinging against the eyes and the sections so as to normally retain said sections in vertical position, but allowing them to swing rearwardly in case they strike obstacles.

The rear ends of the chains 35 are connected by a bar 42. A pair of bars 43 are pivoted at their forward ends to the uprights 18, one above each chain 35. A plurality of hooks or like fastening elements 45 depend from the bars 43 so that they may be engaged with the chains 45. Cables 46 have their lower ends fixed to the bars 43 and are wound on a winch 47 at the rear top of the tank T. Thus when the elements 45 are engaged with the chains 35, the winch may be operated to raise the walls W from the ground, as will be desirable when the apparatus is being transported from place to place, and not in actual use.

From the above detailed description, it will be seen that I have devised a very efficient and reliable apparatus for burning a strip of ground ahead of a prairie fire for the purpose of stopping the progress of said fire along a certain predetermined line. Particular attention is directed to the fact that the apparatus performs its intended function without any danger of allowing the fire to spread.

The present embodiment of the invention has been disclosed in detail merely by way of example, since in actual practice, it attains the features of advantage enumerated as desirable in the statement of the invention and the above description. Numerous changes in the details of construction, and in the combination and arrangement of parts may be resorted to without departing from the spirit or scope of the invention as hereinafter claimed, or sacrificing any of its advantages.

Having thus described my invention, what I claim as new is:—

An apparatus of the class described, including means for burning prairie grass, fire extinguishing means disposed about the first means, a pair of flexible fire confining walls, outside of the second means, each wall comprising a chain formed of a plurality of pivoted links, sections pivotally mounted on the chain and depending therefrom, and spring means tending to hold the sections in vertical positions.

In testimony whereof I affix my signature.

HARVEY B. MORTER.